United States Patent [19]
Baker et al.

[11] 3,872,797
[45] Mar. 25, 1975

[54] TRAILER HITCH TIE-DOWN ASSEMBLY

[75] Inventors: William R. Baker, Northville; Israel D. Peisner, Huntington Woods, both of Mich.

[73] Assignee: Whitehead & Kales Company, River Rouge, Mich.

[22] Filed: Jan. 28, 1974

[21] Appl. No.: 437,286

[52] U.S. Cl. ...... 105/368 T, 105/369 A, 248/119 R, 280/179 A
[51] Int. Cl. .............................................. B60p 7/08
[58] Field of Search .................... 105/368 T, 369 A; 280/179 A; 248/361 A, 119 R, 393; 292/60, 266, 278; 296/1 A

[56] References Cited
UNITED STATES PATENTS
3,054,363  9/1962  Baker .............................. 105/368 T Primary Examiner—M. Henson Wood, Jr.
Assistant Examiner—Gene A. Church
Attorney, Agent, or Firm—Whittemore, Hulbert & Belknap

[57] ABSTRACT

Tie-down structure for securing a vehicle such as a recreational or commercial trailer on the deck of a transport. The tie-down structure in the specific embodiment disclosed comprises a pivoted support frame which is held in an upright, operative position when in use, and may be swung to a generally horizontal, inoperative position when not in use.

7 Claims, 8 Drawing Figures

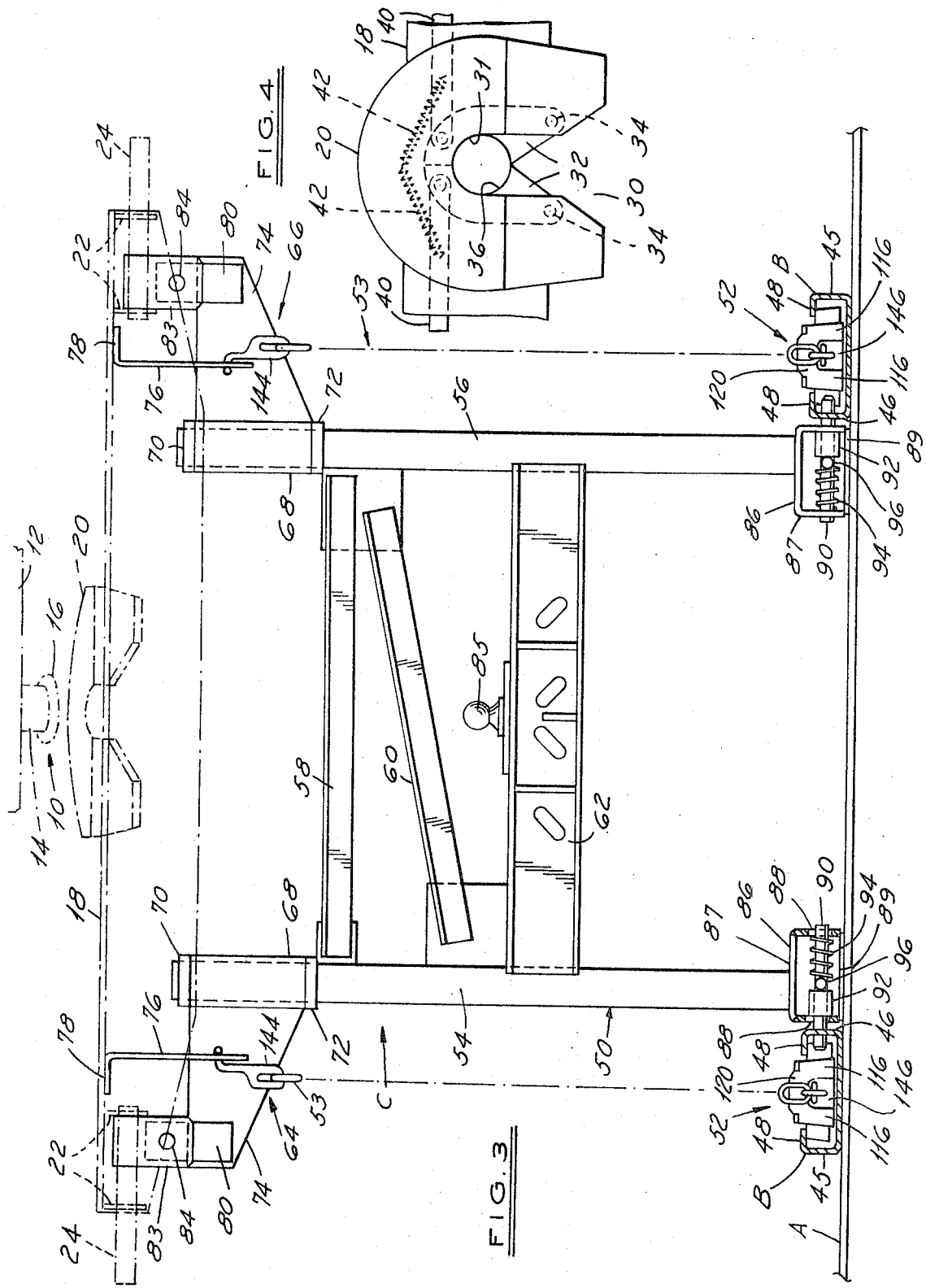

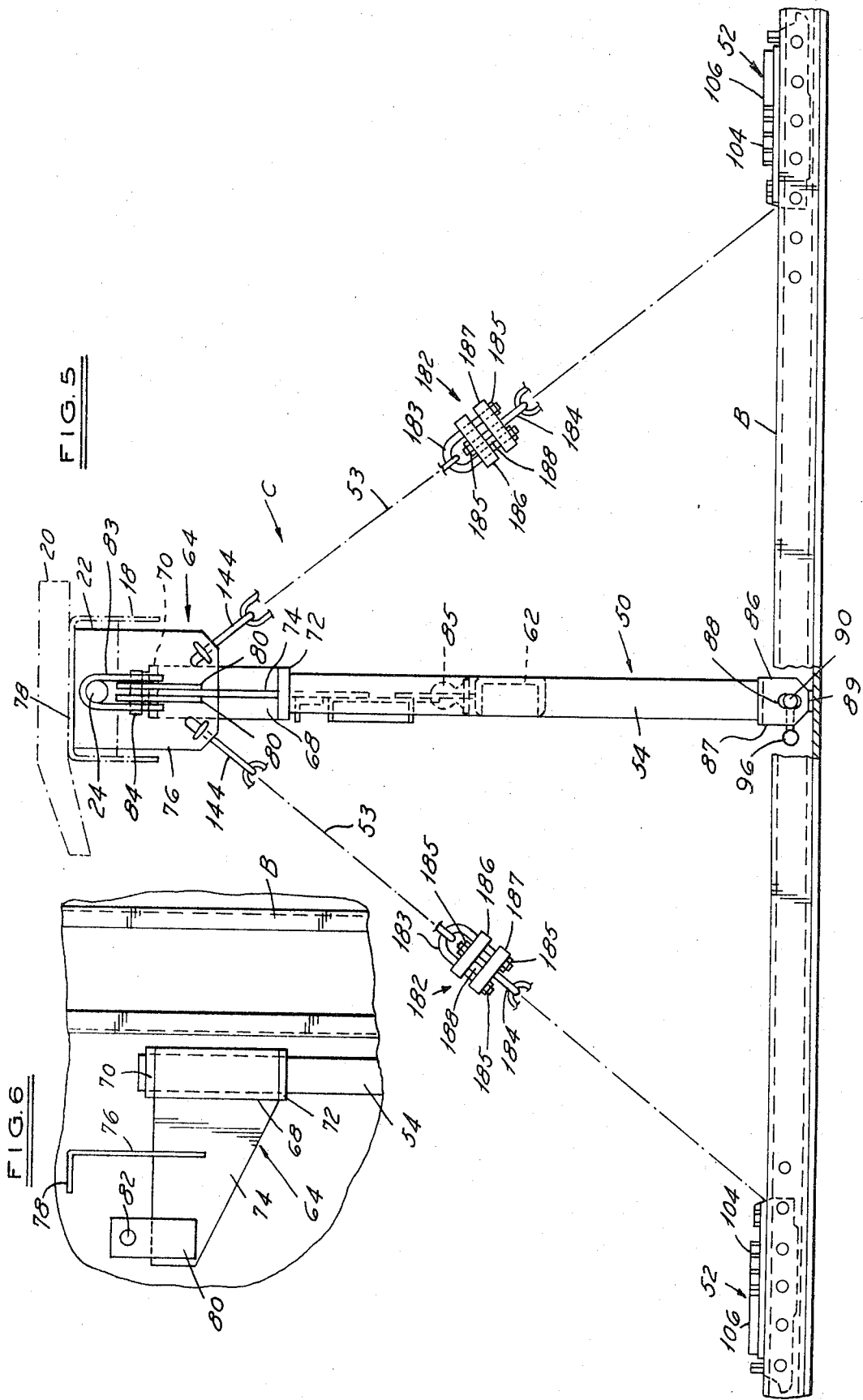

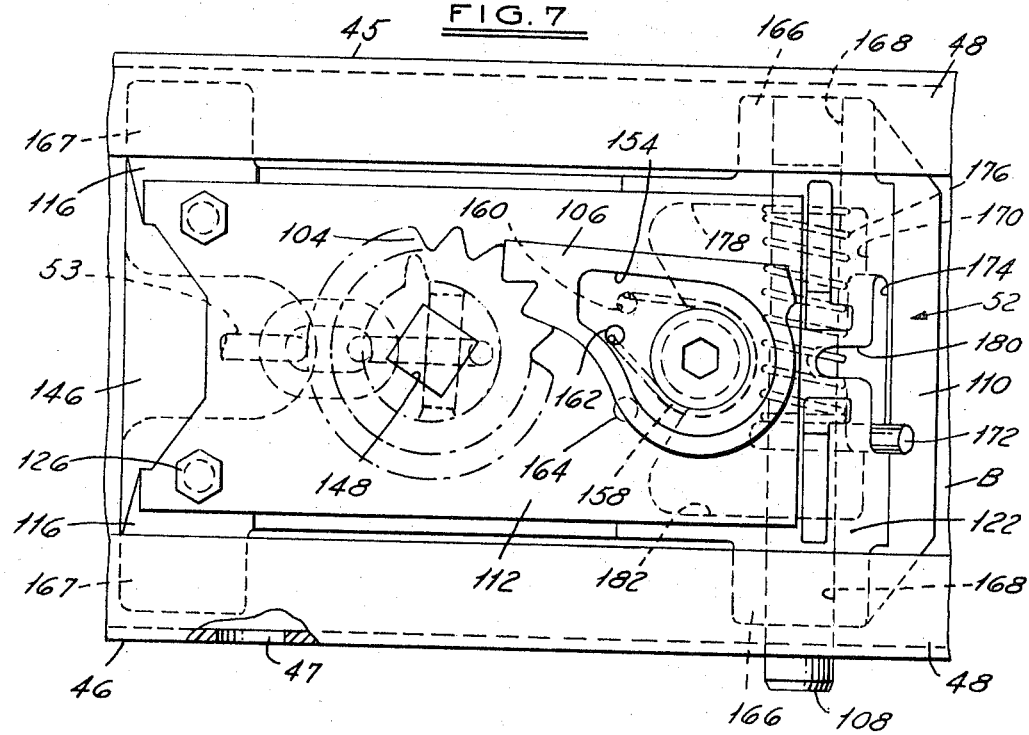
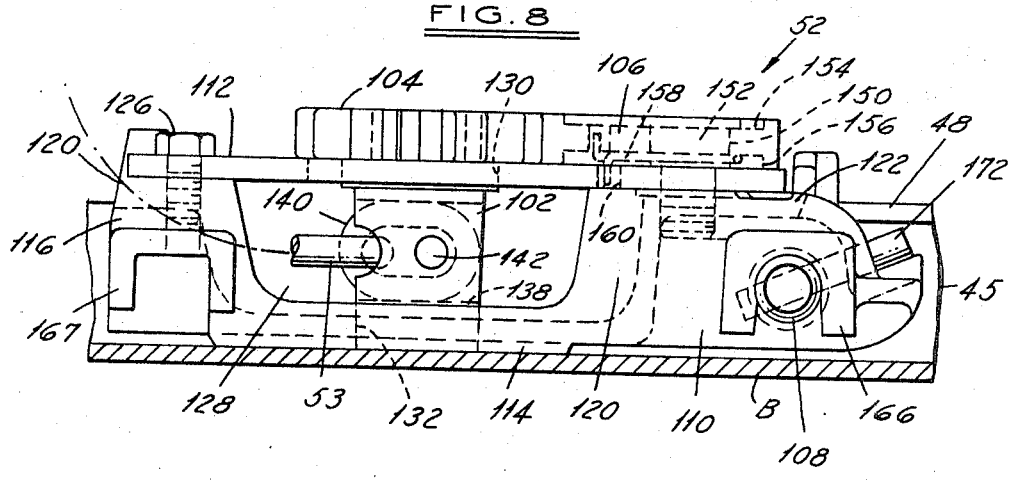

TRAILER HITCH TIE-DOWN ASSEMBLY

SUMMARY OF THE INVENTION

The tie-down structure of this invention is employed to secure vehicles in fixed positions at selected points along the length of the deck of a transport, such as a rail car. The tie-down structure is especially designated to tie down recreational or commercial trailers having hitches either of the fifth wheel or ball type.

The tie-down structure comprises a support frame which is pivoted to a pair of rails or channels extending lengthwise of the deck. The support frame is held in an upright, operative position by chains attached to carriages locked in the channels on opposite sides of the support frame. When not in use, the frame is swung to an inoperative, generally horizontal position between the channels so as not to interfere with vehicles being loaded and unloaded.

In the drawings:

FIG. 3 is a view taken transversely of the rail car showing the supporting frame of the tie-down structure in upright or operative position.

FIG. 4 is a fragmentary detail view of a portion of the crossbar which comprises a part of a fifth-wheel hitch.

FIG. 5 is a side elevational view of the tie-down structure shown in FIG. 3.

FIG. 6 is a fragmentary detail of a portion of the supporting frame of the tie-down structure when the latter is turned to a generally horizontal, inoperative position.

FIG. 7 is a top view of a carriage employed to hold the supporting frame of the tie-down structure in operative position, the carriage being disposed in one of the channels on the rail car.

FIG. 8 is a side elevational view of the carriage shown in FIG. 7, a portion of the channel being broken away.

Referring now more particularly to the drawings, A is a longitudinally extending elongated substantially flat horizontal deck of a transport such for example as a railroad flat car. B are stationary main supporting channels or rails disposed in laterally spaced substantially parallel relation to each other and extending throughout substantially the entire length of the deck, and C is a tie-down structure for securing a wheeled vehicle such as a recreational or commercial trailer in fixed position on the deck in spaced relation to other such vehicles along the length thereof.

Figure 1:
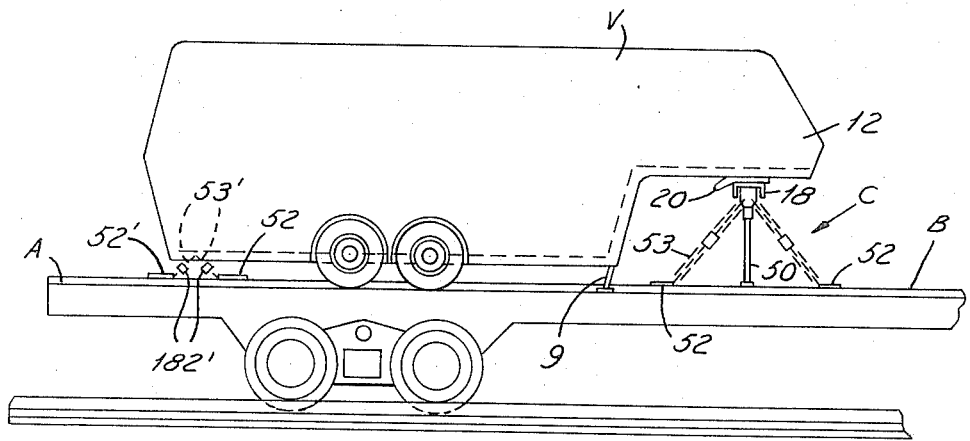
FIG. 1 is a fragmentary side elevational view showing a trailer having a fifth-wheel hitch secured in fixed position on the deck of a rail car by tie-down structure embodying our invention.
Figure 2:
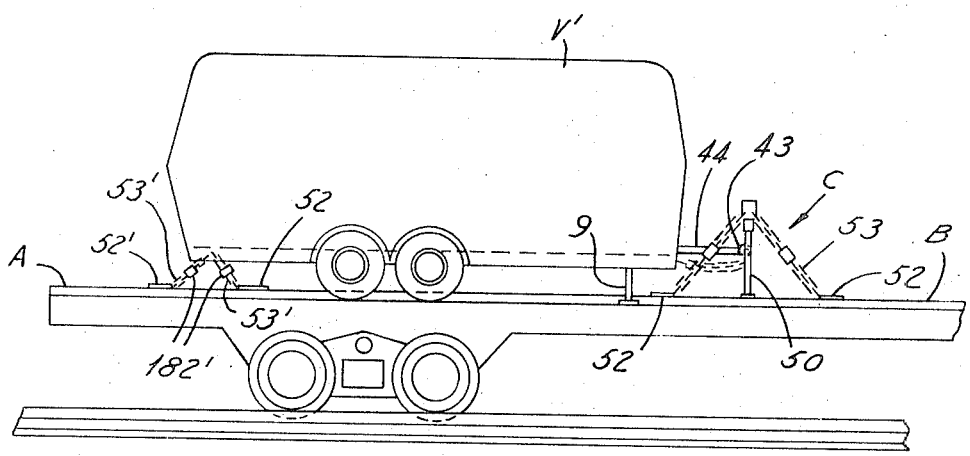
FIG. 2 is similar to FIG. 1 showing a trailer having a ball-type hitch secured in fixed position on the deck of a rail car by the same tie-down structure.

Preferably the area of the deck A is such that it is capable of supporting thereon in tandem several vehicles of various sizes, i.e. vehicles having different lengths and/or widths. FIG. 1 shows a fifth-wheel trailer V tied down on the deck of the rail car by the tie-down structure C. FIG. 2 shows a trailer V' having a ball-type hitch tied down on the deck of the rail car by a like tie-down structure C. Both trailers V and V' have legs 9 which may be lowered into ground engagement to support the trailers or raised out of ground engagement when the trailers are hitched to a towing vehicle.

The fifth-wheel hitch for the trailer V may be of any suitable construction. In the present instance, such fifth wheel structure is shown as comprising a kingpin assembly 10 mounted on the trailer under the nose 12 of the trailer and having a depending pin 14 with radially outwardly extending circular flange 16 on the lower end. The fifth-wheel hitch also includes the crossbar 18 having the yoke 20 secured thereon with which the pin 14 of the kingpin assembly 10 is adapted to be engaged. The crossbar is an elongated member of inverted channel form having at each end the longitudinally spaced transverse plates 22 within the channel to which a bearing pin 24 is secured. The pins 24 are spaced inwardly from the side flanges and downwardly from the base of the channel and extend lengthwise of the channel beyond the ends for engagement with suitable trunnions on a towing vehicle. The yoke 20 is generally U-shaped having an open throat 30 at the rear which leads to a semi-circular socket 31 of the same diameter as pin 14, so that pin 14 may enter the socket from the rear and be retained from lifting out by its flange 16 which underlies the semi-circular socket. The pin 14 is further retained against lifting up out of the socket by levers 32 pivoted at 34 to the underside of the arms of the yoke. The levers have opposed semi-circular pin engaging edges 36 of the same diameter as socket 31 which encircle the pin 14 above its flange 16 when the levers are closed as in FIG. 4. As also seen in FIG. 4, these levers 32 prevent the pin 14 from pulling out rearwardly through the open throat of the yoke by the geometry of their pivotal mountings at 34 which increases the closing force of the levers when a rearward force is applied to them. These levers 32 may be opened manually by control members 40 pivoted to the swinging ends of the levers. Tension springs 42 connected at their ends to the yoke and to control members 40 urge the levers 32 to the closed position illustrated.

The ball-type hitch for trailer V' in FIG. 2 comprises a socket member 43 on the draft frame 44 of the trailer adapted to engage and be secured to a ball mounted, for example, on the bumper of a towing vehicle.

The parallel main supporting channels B are rigidly secured to the supporting deck A in positions such that the wheels of the vehicles will run along paths laterally outwardly of the channels. Each channel B has parallel upstanding side walls 45 and 46. The inner side wall 46 has a series of equally spaced holes 47 or apertures formed along the length thereof. The side walls 45 and 46 terminate in horizontal inturned flanges 48.

The tie-down structure C comprises a support frame 50, carriages 52 disposed within the channels B on both sides of the support frame, and flexible linear members preferably in the form of link chains 53 secured to and extending between the upper portion of the support frame 50 and the carriages 52 to hold the frame upright. One such tie-down structure is provided for each vehicle or trailer to be tied down upon the deck A.

The support frame 50 of the tie-down structure C comprises a pair of elongated, laterally spaced, parallel bars 54 and 56 which are rigidly connected together by the cross beams 58, 60 and 62. These bars 54, 56 are spaced apart a distance slightly less than the channels B so that the support frame 50 when assembled with the channels as more fully described hereinafter, will be disposed between the rails as shown in FIG. 3. There is a swivel type mount 64, 66 on the upper end of each frame bar 54, 56 provided to support the crossbar 18 of a fifth-wheel trailer hitch. The mounts 64, 66 comprise open ended tubes 68 which are sleeved on the upper end portions of the form bars between the frame bar collars 70 and 72 for free rotation. Each mount 64, 66 also has a flat plate or web 74 welded or otherwise permanently secured to and extending radially outwardly from the tube 68. The mounts 64, 66 are rotatable 360° and may be turned so that the plates 74 project lateraly outwardly as in FIG. 3 which is their operative position, or laterally inwardly as in FIG. 6 to be disposed in an inoperative position as more fully described hereinafter.

A supporting angle member 76 rigidly secured to each plate 74 has a flange 78 which is disposed above the frame bars 54, 56 when the support frame 50 is upright and provides a horizontal shelf for supporting the crossbar 18 of the fifth-wheel hitch. A pair of tabs 80 are rigidly secured to opposite sides of each plate 74 and extend above the plate 74 in parallel relation, having aligned apertures 82. Pins 84 secure the crossbar 18 of the fifth-wheel hitch to the upright support frame by extending through apertures 82 and through registering apertures in the legs of the U-shaped shackles 83 which hang from pins 24 of the cross-bar.

The support frame 50 also has a ball 85 mounted on frame bar 62. Ball 85 is like the ball of an ordinary ball-type hitch usually mounted on the bumper of a truck or other towing vehicle. The socket member of the hitch, such as socket member 43 in FIG. 2, is adapted to be secured on the ball 85 exactly as it is normally secured to a bumper mounted ball.

A mounting bracket 86 is secured to the lower end of each frame bar 54, 56, comprising an inverted U-shaped member 87 and a plate or pad 89 welded or otherwise permanently secured to the edges of the flanges of the U-shaped member. Aligned apertures 88 are formed in the two flanges of member 87. A locking pin 90 extending across the bracket 86 slides through the aligned apertures 88 and through a collar 92 sleeved on the pin between one of the flanges of the U-shaped member 87 and a lateral projection 96 on the pin. A compression coil spring 94 encircles the pin 90 and presses against the opposite flange of the bracket and against the lateral projection 96 on the pin normally to press the pin to the extended position shown in FIG. 3. In their extended positions, the pins 90 are adapted to project into opposed holes 47 in the inner side walls 46 of the channels B to pivotally connect the support frame at right angles to the channels for swinging movement from the upright, operative position of FIG. 3 to a generally horizontal position between the channels B. When the frame 50 is upright, pads 89 engage the deck of the rail car. It will be noted that apertures 88 are vertically elongated so that the weight of the frame 50 when upright will be on pads 89, not pins 90. The vertically elongated apertures 88 also permit the frame 50 to be lifted slightly to disengage pads 89 from the deck before swinging the frame from upright to horizontal position.

As above stated, carriages 52 and chains 53 are employed to hold the support frame 50 upright. Four carriages 52, two in each channel B on opposite sides of the frame 50, are preferably provided for each tie-down structure C.

Each adjustable carriage 52 may be like that disclosed in U.S. Pat No. 3,564,577 owned by the assignee of this application, to which reference is made for a full disclosure. Such carriage includes a vertical stub shaft 102, a ratchet gear 104 secured to the upper end of the stub shaft 102, a ratchet pawl 106 adapted to engage the teeth of the ratchet gear and prevent rotation of the ratchet gear and stub shaft in one direction, and a transversely extending lock pin 108.

The carriage comprises a body or casting 110 and a low, flat, horizontal top wall or plate 112. The body 110 is an elongated member having a bottom wall or base 114 and laterally spaced upstanding portions 116 at one end which have flat horizontal top surfaces connected by a bridge 120. The body 110 has a laterally extending upstanding portion 122 at the opposite end which has a flat horizontal top surface in the plane of the top surfaces of portions 116. The plate 112 is secured to the top surfaces of the upstanding portions 116 and 122 by means such as the cap screws 126. The bottom wall 114, top plate 112 and upstanding portions 116 and 122 define a space 128, the sides of which are open between the upstanding portions.

The vertical stub shaft 102 is disposed in the space 128 and has its ends journaled for rotation in the circular holes 130 and 132 in the top plate 112 and base 114.

The end link 140 of the chain 53 is extended into a slot 138 in stub shaft 102, and a retainer pin 142 secures the end of the chain in the slot. The opposite end of the chain has a hook 144 of any suitable construction which is adapted to be removably engaged in a suitable opening in an angle member 76 of the support frame 50. The chain extends from the stub shaft 102 through a tunnel 146 between the upstanding portions 116 and beneath the bridge 120.

The ratchet gear 104 is integral with or secured to the upper end of stub shaft 102 above plate 112. The ratchet gear 104 has a polygonal slot 148 adapted to receive a suitable crank for rotating the ratchet gear and winding up the link chain 53 on stub shaft 102. The ratchet pawl 106 prevents rotation of the ratchet gear 104 and hence the stub shaft 102 in one direction. The ratchet pawl 106 is pivoted to the top plate 112 for rotation about a vertical axis on the upper, enlarged cylindrical portion 150 of the screw 152 which threads into the upstanding portion 122 of body 110.

The pawl 106 has recessed top and bottom surfaces where indicated at 154 and 156. A spring 158 disposed in the lower recess 156 and extending around the enlarged portion 150 of screw 152 has one bent end extended into a hole 160 in the top plate 112 and the other bent end extended into a hole 162 in the pawl 106. Thus considering FIG. 7, the pawl is urged counterclockwise into engagement with the teeth of the ratchet gear 104, preventing the ratchet gear from rotating clockwise but permitting counterclockwise rotation thereof. The plate 112 will be seen to have a second hole 164. The second hole 164 is for use when the ratchet pawl 106 is turned over or reversed in assembly in order to prevent rotation of the ratchet gear 104 in the opposite direction, or counterclockwise. Thus when the pawl 106 is assembled on its opposite side, the spring 158 is received in recess 154 and one bent end of spring is received in the hole 164 of plate 112 rather than hole 160 so as to urge the pawl in a clockwise direction.

The lock pin 108 is an elongated cylindrical member which extends transversely of the carriage. The body 110 has a pair of aligned laterally outwardly extending bosses 166 which project from the outstanding portion 122 at one end of body 110. The end portions of the lock pin 108 are slidably and rotatably received in aligned cylindrical passages 168 in the bosses 166. The intermediate portion of the lock pin extends across the cavity 170 within the upstanding portion 122.

A handle in the form of a transverse pin 172 is secured to an intermediate portion of the lock pin 108 and extends through an elongaged transverse slot 174 in the rear wall of the upstanding portion 122. A coil spring 176 encircles the lock pin and is compressed between the handle 172 and an interior side wall 178 of the cavity 170 so as to urge the lock pin 108 to its extended position as viewed in FIG. 7 in which handle 172 engages the end of the slot. The slot 174 will be seen to be generally T-shaped having an intermediate offset detent portion 180 for receiving the handle 172 when the lock pin is retracted and rotated, thereby retaining the lock pin in retracted position. It will be understood that lock pin 108 may be extended in the opposite direction by merely assembling the coil spring 176 on the lock pin between the handle 172 and the opposite interior side wall 182 of cavity 170. The opposite end of slot 174 would then, of course, determine the limit of the movement of the lock pin to its extended position. Normally, when the lock pin is reversed so as to project in the opposite direction, the pawl 106 is also reversed.

In addition to bosses 166 at one end, the carriage also has laterally outwardly extending bosses 167 at the opposite end. Bosses 166 and 167 lie under flanges 48 of channels B to prevent the carriages from lifting out of the channels.

The chains 53 preferably will have cushioning means to permit them to elongate slightly when in tension and thereby absorb sudden shocks. Suitable cushioning devices 182 are shown in the drawings. While the details of construction may vary considerably, in the present instance such devices each comprise U-shaped shackles 183 and 184 interlinked in the chain and having nuts threaded on the free ends of the legs thereof to provide abutments 185. Retainers 186 and 187 are each slidable on the four legs of shackles 183 and 184 between abutments 185, and a pad 188 of resilient compressible material is sandwiched between the retainers 186 and 187 within the space defined by the shackle legs. Tension in the chain 53 will compress the resilient pad.

Prior to loading trailers V or V' upon the deck of the rail car, a plurality of tie-down structures C are engaged to the channels B at spaced points along the length of the deck, each in the approximate position for supporting one of the trailers. Thus the support frame 50 of each tie-down structure C is positioned at right angles to and between the channels B and the pins 90 are engaged in an opposed pair of holes 47 in the inner side walls 46 of the channels. The support frames 50 are turned to a substantially horizontal position resting upon the deck between the channels with the swivel or wing-type mountings 54, 56 turned inwardly as in FIG. 6, so as not to interfere with the trailers as they are loaded. The carriages 52 are disposed in the channels B on both sides of each support frame but are not chained to the support frame. These carriages may be introduced into the channels from either open end thereof prior to pinning the support frames to the channels.

A trailer suitably hitched to a towing vehicle is then driven onto the rail car to a position such that the trailer hitch assembly is approximately over a support frame. Thereafter the support legs 9 of the trailer are lowered and the trailer unhitched from the towing vehicle so that the front end of the trailer is supported by the legs 9, after which the towing vehicle is driven away. If the trailer has a fifth-wheel type hitch, the crossbar 18 is released from the towing vehicle so that the entire hitch including the kingpin assembly 10 and the crossbar 18 remains attached to the trailer.

The support frame 50 is then turned to the upright position of FIGS. 3 and 5 and secured in this position by hooking the chains 53 to the angle members 76 of the support frame. The carriages 52 are suitably locked in position by their locking pins 108 and the chains 53 tightened by the ratchet gears and pawls 104, 106 on the carriages to hold the support frame securely in the upright position. Thereafter, the support legs 9 of the trailer are raised to lower the nose of the trailer and deposit the crossbar 18 upon the supporting angle members 76, as shown in FIGS. 3 and 5. Before the cross member is lowered to this position, however, the shackles 83 are engaged over the pins 24. Locking pins 84 are then extended through registering openings in the shackles 83 and in the tabs 80 of the support frame 50 to lock the crossbar 18 to the support frame.

If the trailer has a ball-type hitch, its socket member 43 is engaged with the ball 85 on a support frame and locked thereto in the same manner that it would ordinarily be secured to the ball on the bumper of a towing vehicle.

FIGS. 1 and 2 show the rear of the trailers tied down by chains 53' and carriages 52'. Such additional tie-down equipment may or may not be employed, as desired. It is not absolutely necessary. Carriages 52' may be exactly like carriages 52, and locked in channels B in the same manner. Chains 53' may be exactly like chains 53, preferably having cushioning devices 182' like cushioning devices 182 and hooked to the underframe of the trailer by hooks similar to hooks 144.

In order to unload the trailers, the rear chains 53', if employed, are detached from the trailer, locking pins 84 are removed to release the crossbar 18 from the frame 50, the legs 9 are lowered to raise the front end of the trailer so that the crossbar 18 is elevated clear of the frame. The chains 53 are slackened, either by releasing the pawl 106 or by unpinning the carriages, and detached from the support frames 50. The support frame is turned to the horizontal position with mounts 64, 66 turned inwardly so that the released trailer may be hitched to a towing vehicle and driven off the rail car. If the trailer has a ball-type hitch, the same procedure is followed, that is the socket member 43 is released from ball 85 and separated therefrom by lowering legs 9 to raise the front of the trailer, after which the chains are slackened, detached from the support frame, and the support frame swung to horizontal position.

What we claim as our invention is:

1. Tie-down structure for securing a trailer on the elongated deck of a transport, comprising a pair of elongated laterally spaced parallel rails adapted to be anchored lengthwise upon the deck, a support frame having a pair of laterally spaced parallel bars, means for pivotally mounting said frame between said rails in selected positions along the length of said rails for swinging movement from a generally horizontal to an upright position, said pivotal mounting means comprising laterally extending pins carried by the lower ends of said bars, pin-receiving apertures in said rails spaced apart along the length thereof, said pins being received in any opposed pair of apertures in said rails, means for releasably holding said frame in upright position comprising carriages, pins on said carriages receivable in said rail apertures to secure said carriages in adjusted positions on opposite sides of said frame, flexible linear members connected to and extending between said frame and said carriages, and means for securing the trailer to the upper portion of said frame in the upright position of the latter.

2. The tie-down structure defined in claim 1, wherein said linear members include resiliently extensible elements.

3. The tie-down structure defined in claim 1, wherein said means for securing the trailer to said frame comprises mounts disposed adjacent the top of said frame when the latter is upright, and means on said mounts for supporting and securing thereto the crossbar of a fifth-wheel trailer hitch.

4. The tie-down structure defined in claim 3, wherein said mounts are pivotally carried by said frame so that they may be turned laterally outwardly for use or laterally inwardly to clear said rails when said frame is swung to its generally horizontal position.

5. The tie-down structure defined in claim 1, wherein said means for securing the trailer to said frame comprises a ball member mounted on said frame.

6. Tie-down structure for securing a trailer on the elongated deck of a transport, comprising a pair of elongated laterally spaced parallel rails adapted to be anchored lengthwise upon the deck, a support frame, means pivotally mounting said frame between said rails in selected positions along the length of said rails for swinging movement from a generally horizontal to an upright position, said pivotal mounting means comprising laterally extending pins carried by the lower end of said frame, pin-receiving apertures in said rails spaced apart along the length thereof, said pins being received in any opposed pair of apertures in said rails, means for releasably holding said frame in upright position comprising flexible linear members connected at one end to said frame near the upper end thereof, means connecting the other ends of said flexible linear members to said rails on opposite sides of said frame comprising pins received in selected apertures in said rails, and means for securing the trailer to the upper portion of said frame in the upright position of the latter.

7. Tie-down structure for securing a trailer on the elongated deck of a transport, comprising a pair of elongated laterally spaced parallel rails adapted to be anchored lengthwise upon the deck, a support frame, means for pivotally mounting said frame between said rails in selected positions along the length of said rails for swinging movement from a generally horizontal to an upright position, means for releasably holding said frame in upright position, means for securing the trailer to the upper portion of said frame in the upright position of the latter comprising laterally spaced mounts disposed adjacent the top of said frame when said frame is upright, and means on said mounts for supporting and securing thereto a trailer hitch, said mounts being pivotally mounted on said frame so that they may be turned laterally outwardly for use or laterally inwardly to clear said rails when said frame is swung to its generally horizontal position.

* * * * *